Figure 11:
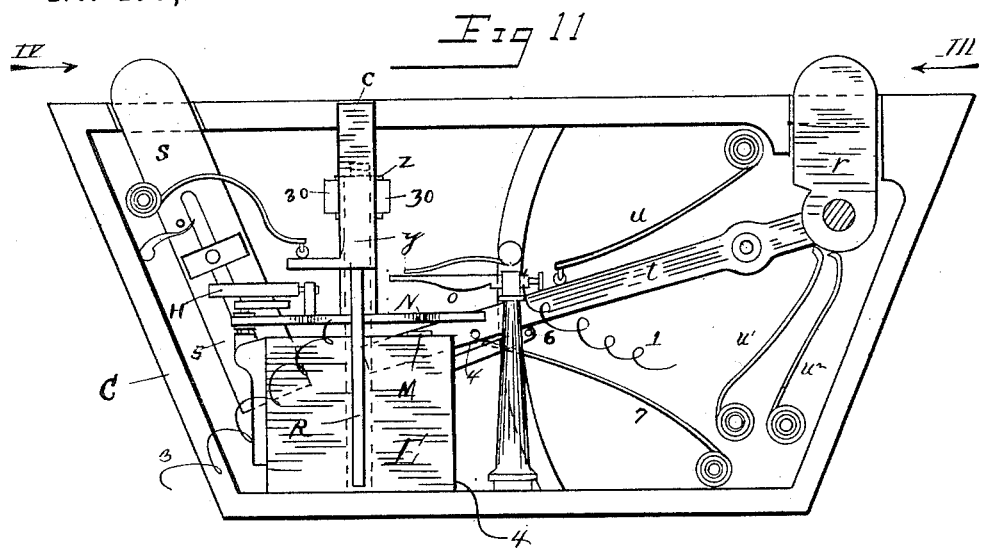
Figure 13:
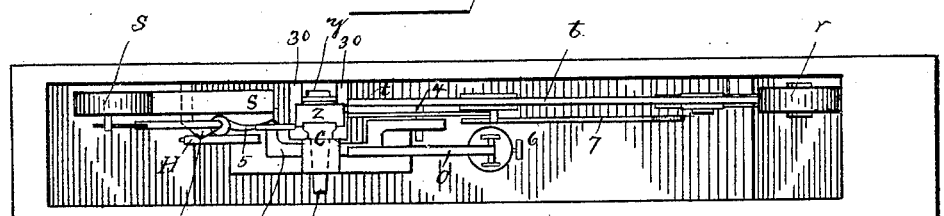
Figures 15, 16:
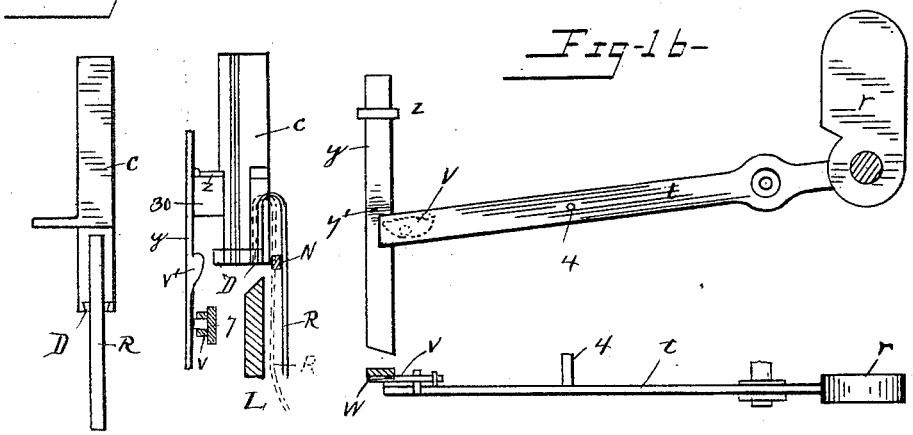
Figure 21:
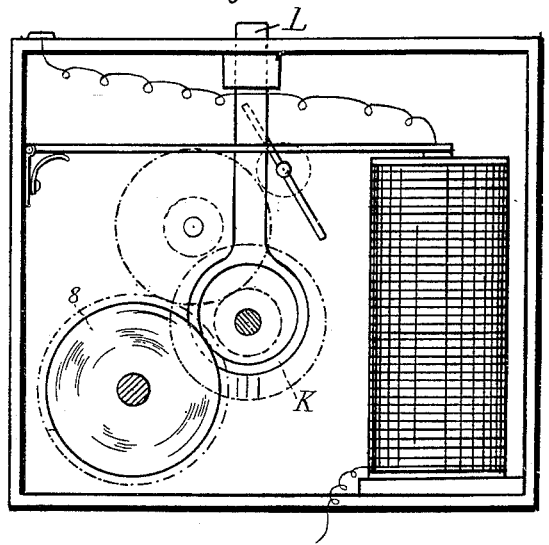
Figure 22:
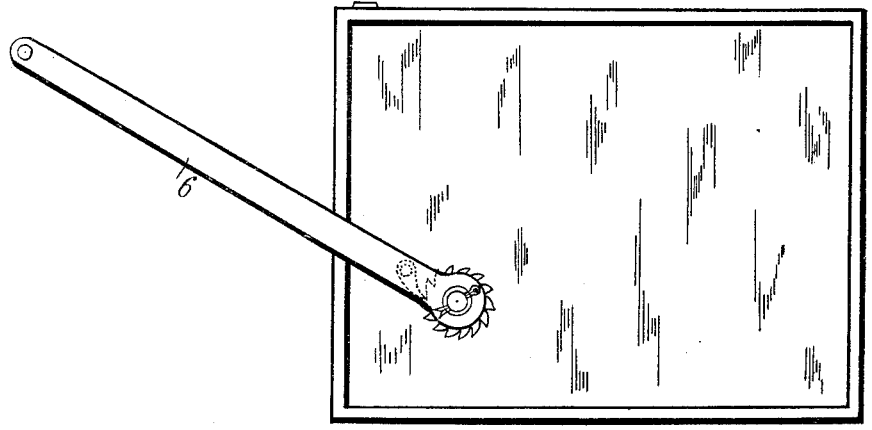
Figure 26:
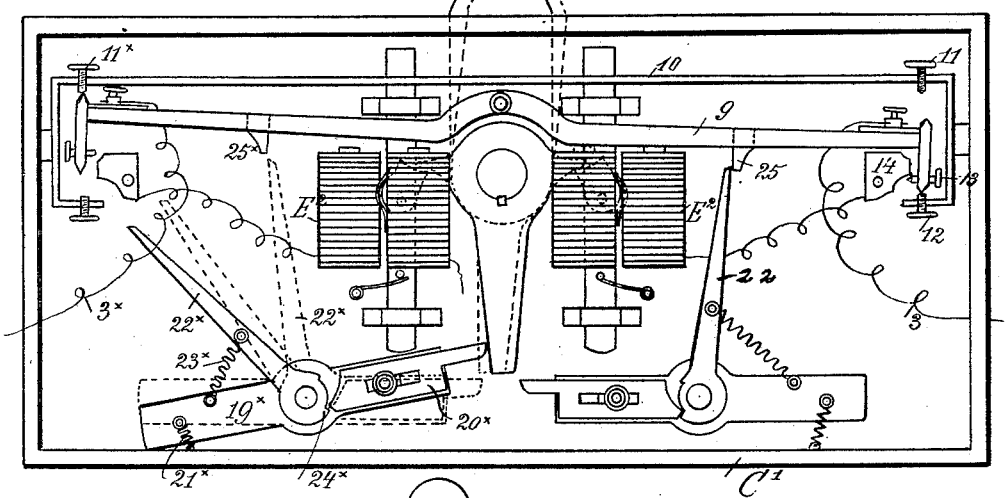
Figure 27:
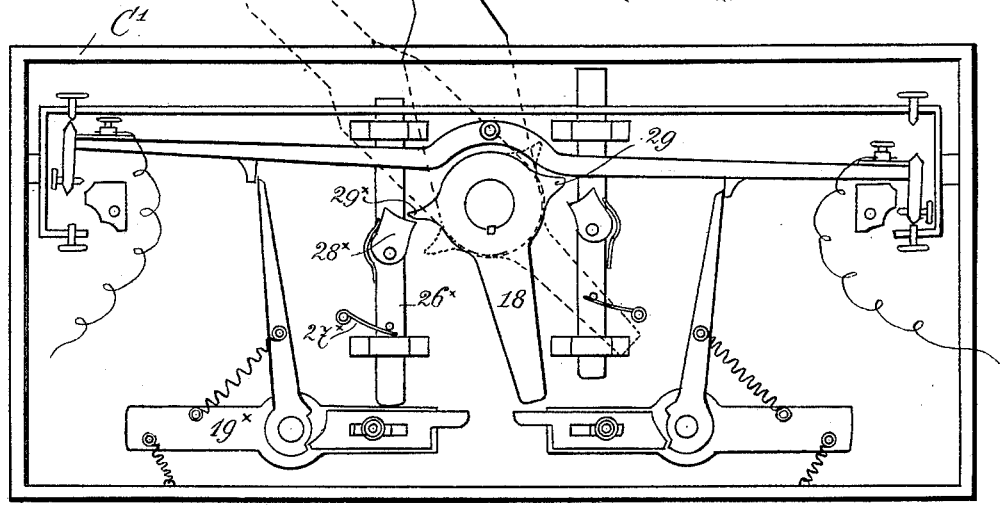

(No Model.) 11 Sheets—Sheet 1.
H. G. HELD.
MEANS FOR PREVENTING COLLISIONS ON RAILWAYS.
No. 477,212. Patented June 21, 1892.
Fig. 1.
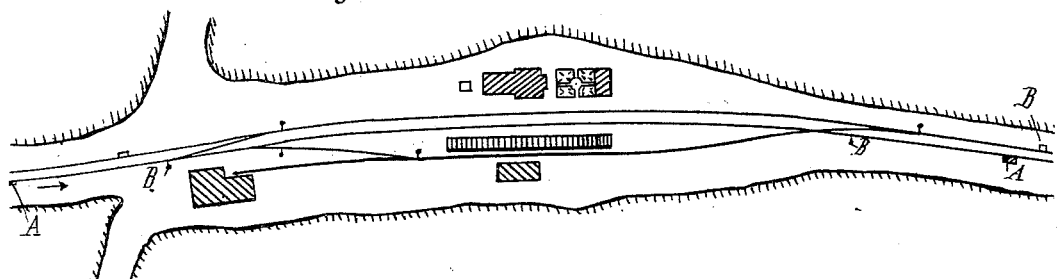
Fig. 3.
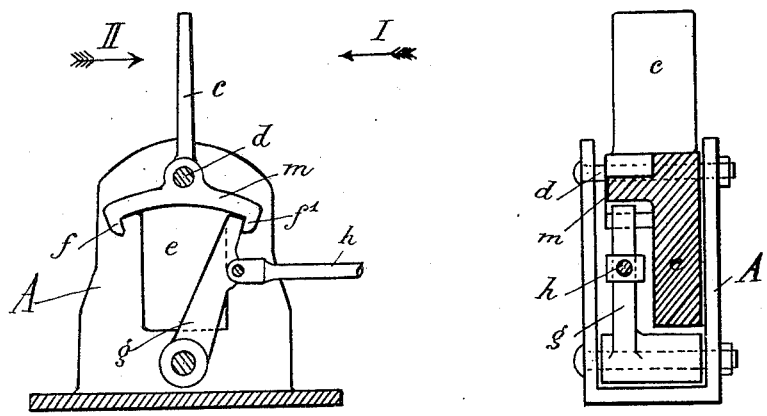
Fig. 4.
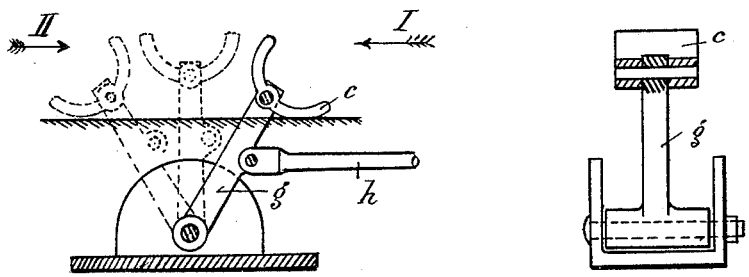
Witnesses:
E. R. Brown
E. L. Richards
Inventor:
Heinrich Georg Held,
By
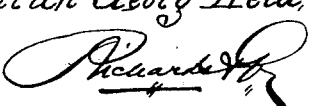
Attorneys.

(No Model.) 11 Sheets—Sheet 2.
H. G. HELD.
MEANS FOR PREVENTING COLLISIONS ON RAILWAYS.
No. 477,212. Patented June 21, 1892.
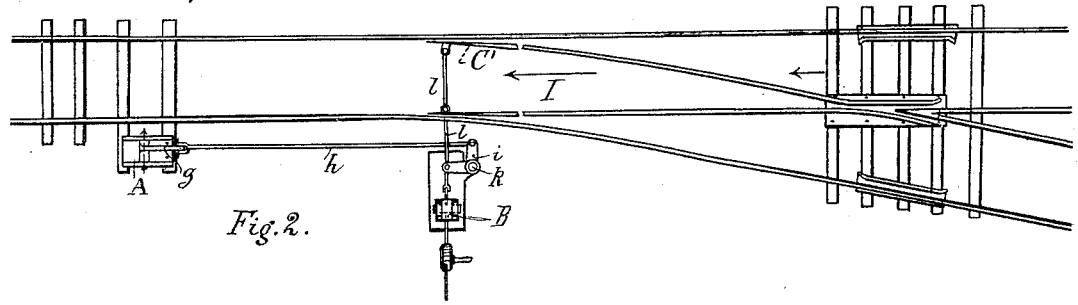
Fig. 2.
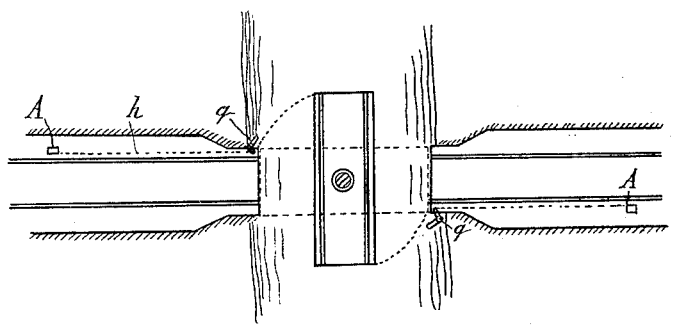
Fig. 8.
Fig. 5.
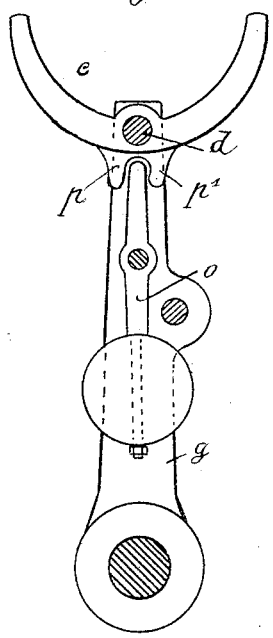
Fig. 7.
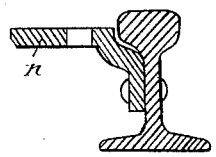
Fig. 6.
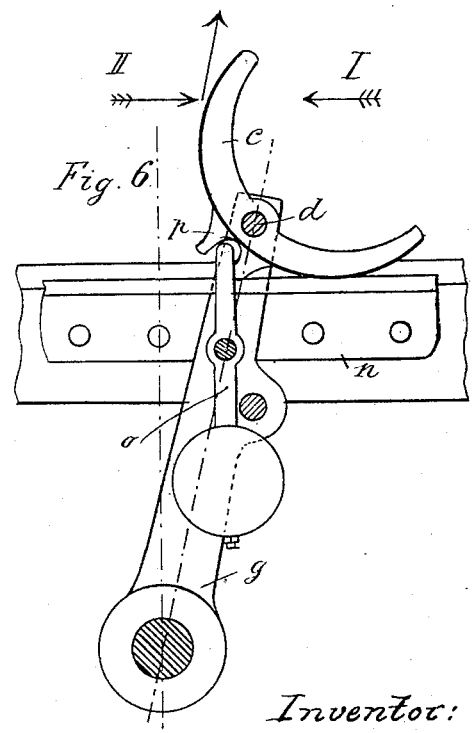
Witnesses:
E. R. Brown
C. L. Richards
Inventor:
Heinrich Georg Held
By Richards & Co.
Attorneys.

(No Model.) 11 Sheets—Sheet 3.
H. G. HELD.
MEANS FOR PREVENTING COLLISIONS ON RAILWAYS.
No. 477,212. Patented June 21, 1892.
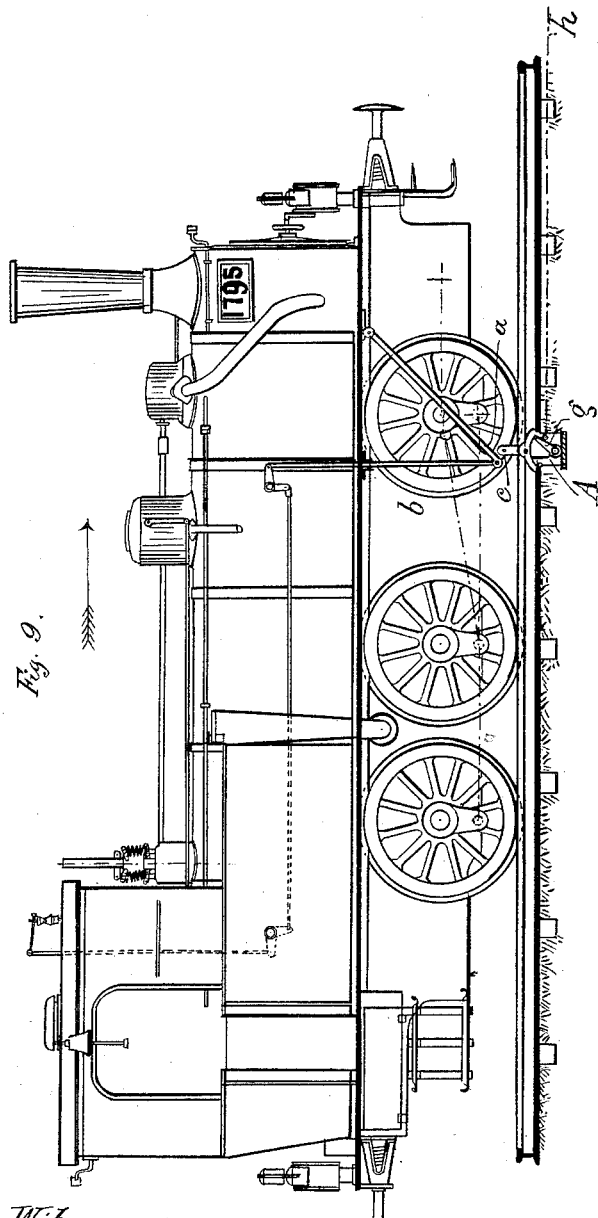
Witnesses:
E. R. Brown
E. L. Richards
Inventor:
Heinrich Georg Held
By Richards
Attorneys.

(No Model.) 11 Sheets—Sheet 4.

H. G. HELD.
MEANS FOR PREVENTING COLLISIONS ON RAILWAYS.

No. 477,212. Patented June 21, 1892.

Witnesses
Louis S. Thomason
W. S. Boyd.

Inventor
Heinrich Georg Held
by Richards & Co
Attorneys (No Model.) 11 Sheets—Sheet 5.
H. G. HELD.
MEANS FOR PREVENTING COLLISIONS ON RAILWAYS.
No. 477,212. Patented June 21, 1892.
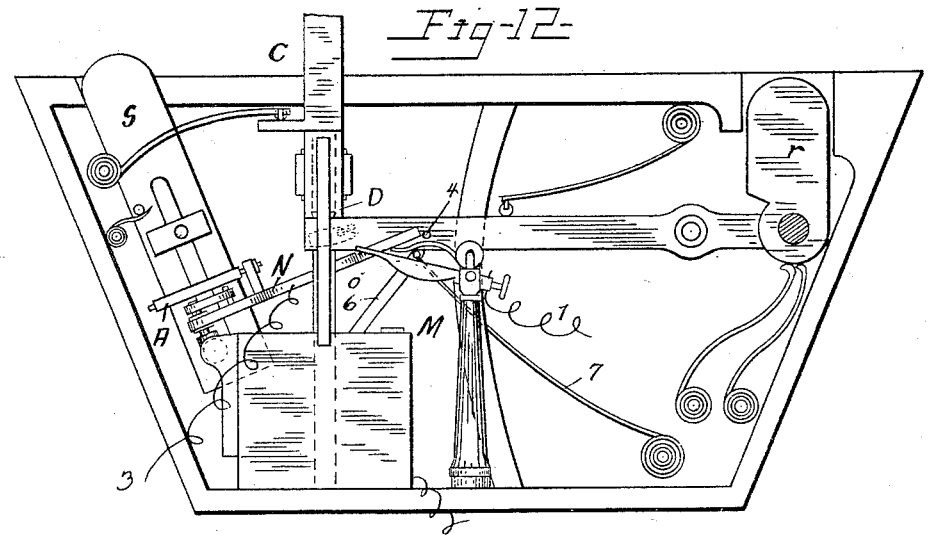
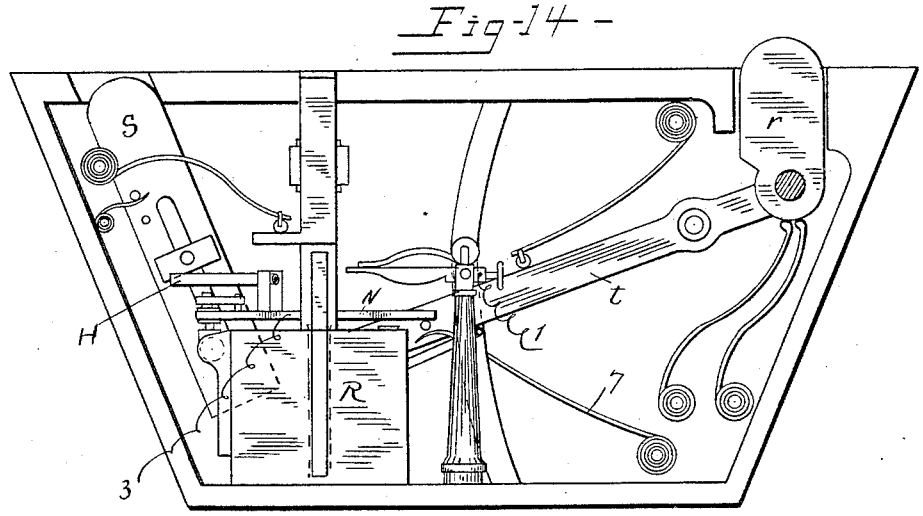
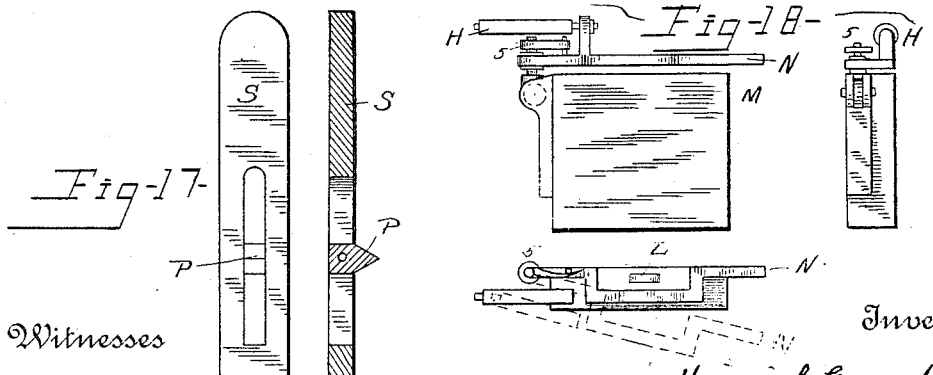

(No Model.) 11 Sheets—Sheet 6.
H. G. HELD.
MEANS FOR PREVENTING COLLISIONS ON RAILWAYS.
No. 477,212. Patented June 21, 1892.
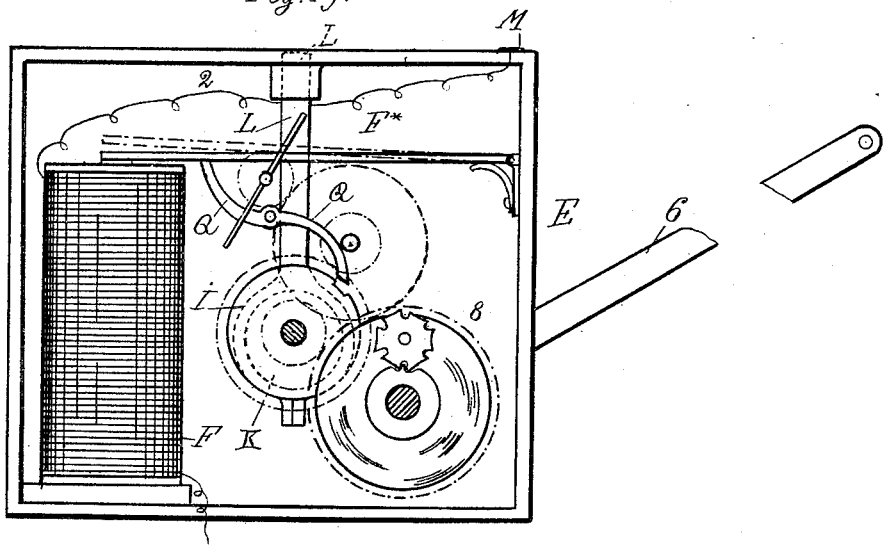
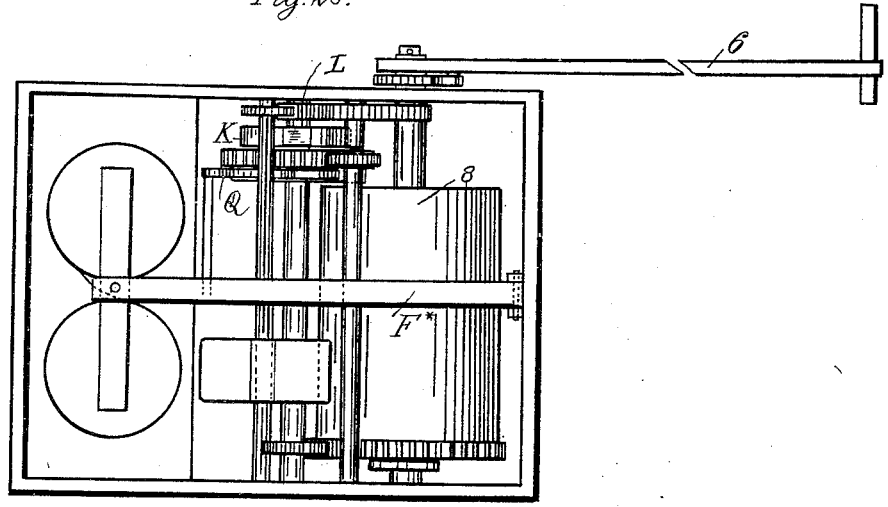
Witnesses:
E. R. Brown
E. L. Richards
Inventor:
Heinrich Georg Held,
By 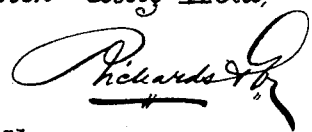
Attorneys.

(No Model.) 11 Sheets—Sheet 7.
H. G. HELD.
MEANS FOR PREVENTING COLLISIONS ON RAILWAYS.

No. 477,212. Patented June 21, 1892.

Witnesses:
E. R. Brown
E. L. Richards

Inventor:
Heinrich Georg Held,
By Richards & Co.
Attorneys.

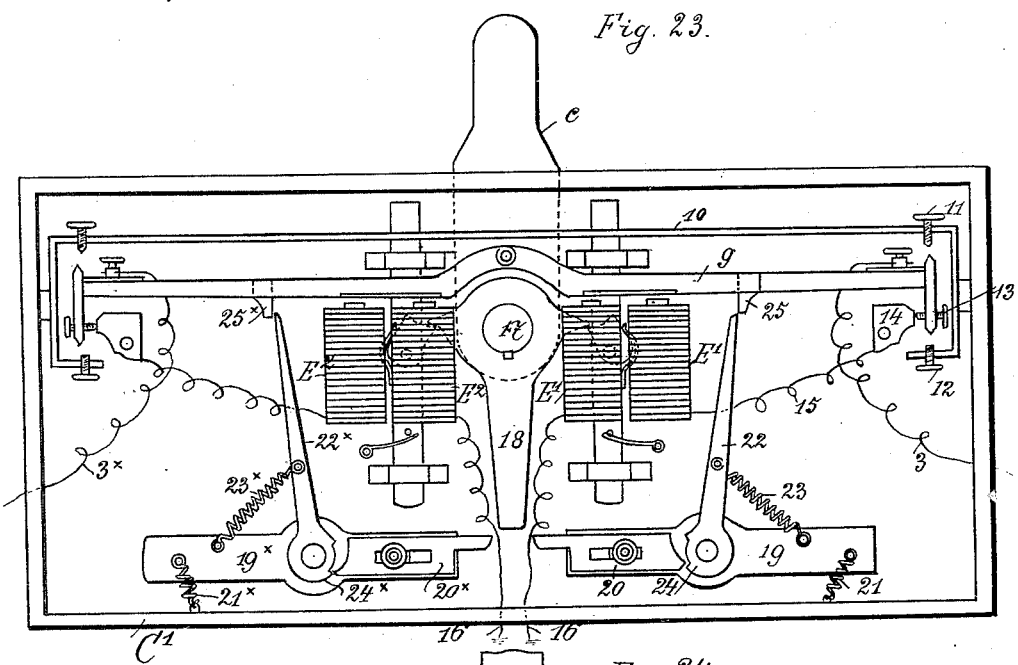

(No Model.) 11 Sheets—Sheet 9.
H. G. HELD.
MEANS FOR PREVENTING COLLISIONS ON RAILWAYS.
No. 477,212. Patented June 21, 1892.

Witnesses:
E. R. Brown
E. L. Richards

Inventor:
Heinrich Georg Held
By Richards &
Attorneys.

(No Model.) 11 Sheets—Sheet 10.
H. G. HELD.
MEANS FOR PREVENTING COLLISIONS ON RAILWAYS.
No. 477,212. Patented June 21, 1892.
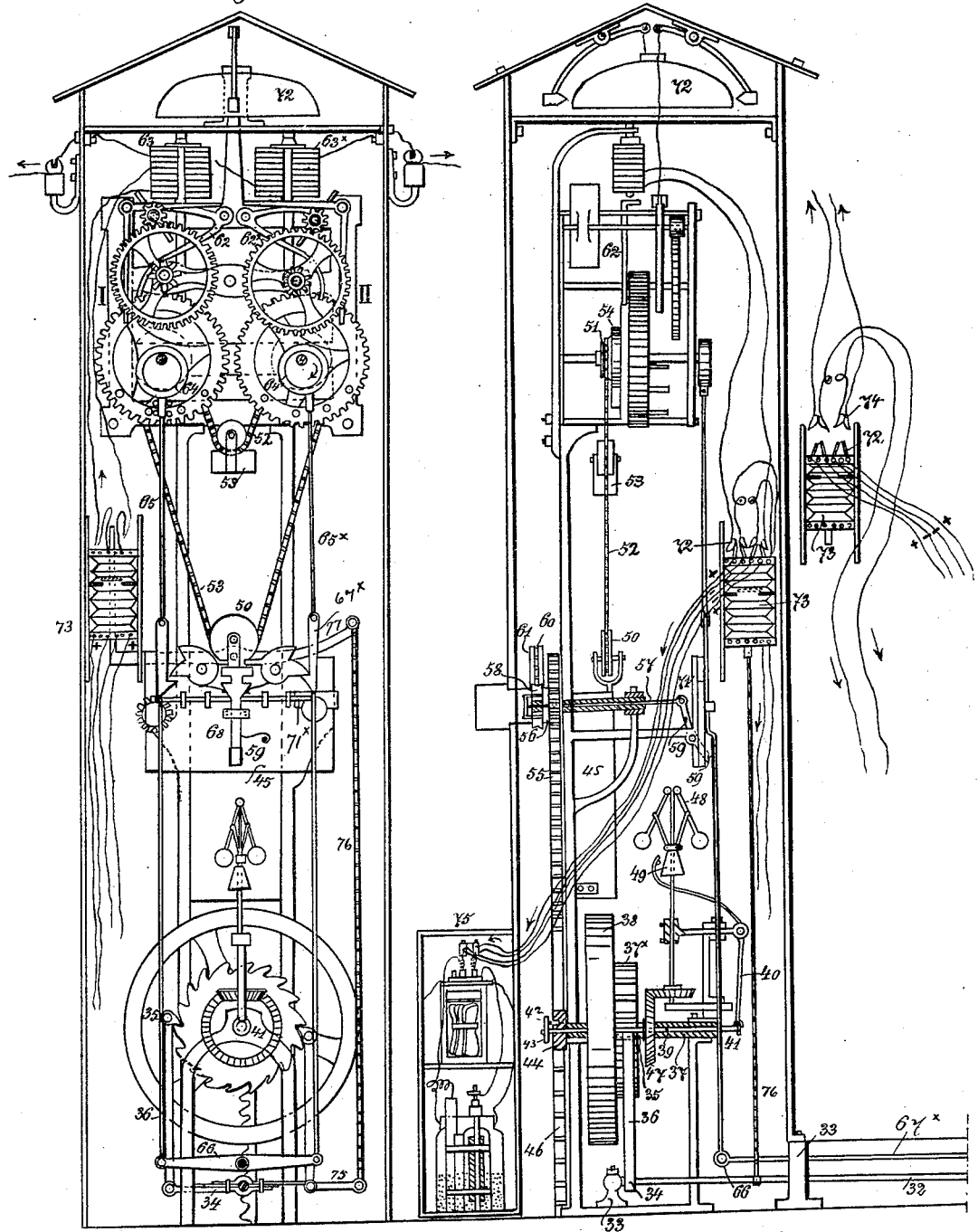
Witnesses:
E. R. Brown
E. L. Richards
Inventor:
Heinrich Georg Held
By Richards
Attorneys.

(No Model.) 11 Sheets—Sheet 11.
H. G. HELD.
MEANS FOR PREVENTING COLLISIONS ON RAILWAYS.
No. 477,212. Patented June 21, 1892.
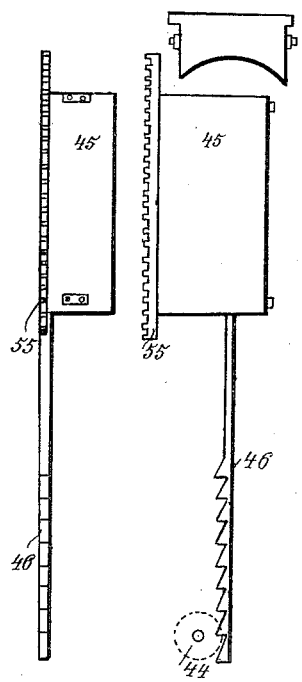
Fig. 31.
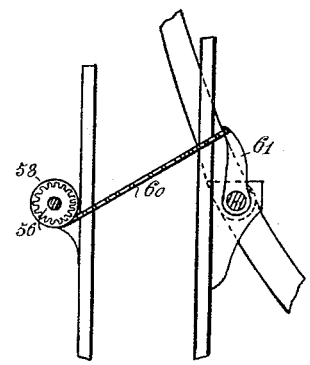
Fig. 32.
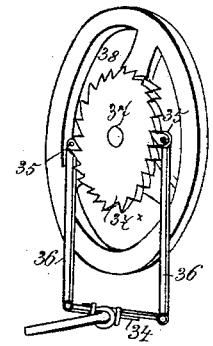
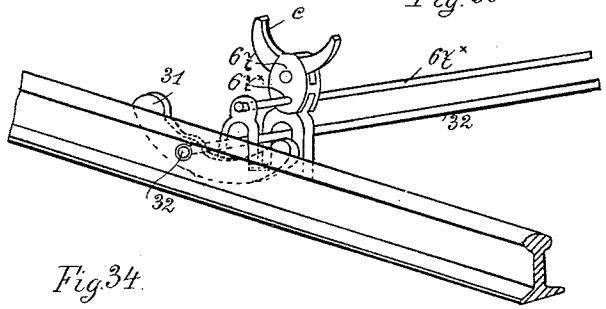
Fig. 30.
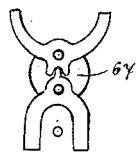
Fig. 34.
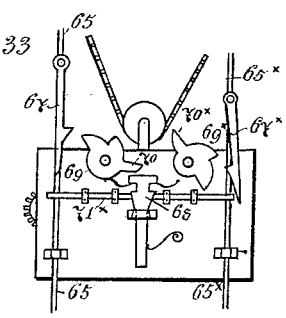
Fig. 33.
Witnesses:
E. R. Brown
E. L. Richards
Inventor:
Heinrich Georg Held
By Richards &c.
Attorneys.

UNITED STATES PATENT OFFICE.

HEINRICH GEORG HELD, OF ZWOLLE, NETHERLANDS.

MEANS FOR PREVENTING COLLISIONS ON RAILWAYS.

SPECIFICATION forming part of Letters Patent No. 477,212, dated June 21, 1892.

Application filed November 19, 1888. Serial No. 291,296. (No model.)

*To all whom it may concern:*

Be it known that I, HEINRICH GEORG HELD, manufacturer, of Zwolle, Netherlands, have invented certain new and useful Improvements in Means or Devices for Preventing Collisions on Railways; and I do hereby declare that the following is a full, clear, and exact description of the same.

The present invention relates to means or devices for securing railway-vehicles, whether engines by themselves or trains, against those accidents that are liable to be caused by the disregard of signals, false placing of points, or by collision with vehicles or trains which travel on the wrong track.

This invention is characterized, *inter alia*, by providing points or tongues of new and special construction, which are capable of motion parallel with the rail and in either direction and capable of being fixed in either position, such tongues or points being placed at certain distances apart from one another upon the line and at the station, this invention comprising the employment of a device upon the engine for actuating the steam-whistle or the air or steam brake, as the case may be, such device being brought into direct contact with the safety appliances on the line when passing over the same, so that the steam-whistle of the railway-engine is automatically caused to sound or that the brakes are automatically applied, and consequently the train stopped.

Signal devices which are operated by passing trains are not new; but those heretofore known present the disadvantage that either the signal is given upon the track so that it may (by reason of inattentiveness or of unfavorable weather) be more or less readily overlooked, or that the movable point will, as set forth in the German Patent No. 18,457, stop not only such trains as move on the wrong track, but every train that passes over the same, and can therefore be employed only at sidings or crossings or at the "home" signals, but never on the line itself. In the arrangement which forms the subject of the present specification these difficulties are entirely obviated, because the point or tongue which indicates "danger" to the train traveling upon the wrong track may be fixed toward one or the other direction, and thus the apparatus is not tied down to a direction of travel fixed once for all. The apparatus may therefore be employed for securing the entire line, and it insures the safety of trains not only against collision with vehicles or trains that may move in a direction opposite to their own, but also against any that may come up behind them.

In the accompanying drawings, Figure 1 shows a general plan of the arrangements in a station; Fig. 2, a switch with a safety device; Figs. 3 to 18, details of the arrangements, and Figs. 9 to 10 the manner of actuating switch from the engine. Figs. 11 to 22 show what is termed the station apparatus in various views and in detail, while Figs. 23 to 27 show what may be termed the "line apparatus" in the various positions it assumes during operation. Figs. 28 to 34 show the movable tongue in combination with an apparatus for producing the forward and backward safety.

As already hereinabove stated, the arrangement for insuring the safety of traveling trains consists in an arrangement or mechanism upon the engine for actuating the steam-whistle or the means for releasing the brakes and with safety devices co-operating therewith which are provided with certain points on the line. The apparatus over which the train passes may at the same time be so arranged that it will send a suitable signal to, say, the station. These safety devices consist, substantially, of a movable tongue capable of being fixed on one side and arranged by the side of the track-rail. It serves to release the steam-whistle or the brakes upon the traveling locomotive.

The lever mechanism consists of a striking-rod *a*, which stands at as slight an incline as possible to the track, and of the crank-rod *b*, moving in a straight path. The latter is at one end connected with the striking-rod *a* and at the other with the valve-gear of the steam-whistle or with the valve-gear of the steam or air brake, Figs. 9, 9ª, and 10.

The construction of the safety apparatus provided by the side of the track-rails differs according to the nature of the accidents that are to be prevented. They, however, always possess the characteristic movable tongue fixed for the train in danger, and consequently actuating the lever mechanism on the locomotive, while the same tongue is not fixed for such trains as pass and are not endangered—i. e., pass normally—and consequently cannot actuate the lever mechanism $a\,b$ on the engine or locomotive.

The safety apparatus, Figs. 1 and 2, which is to advise the engine-driver when a switch is set against him, will be first considered. The safety apparatus consists of a movable tongue $c$, pivoted in the block A. The tongue is at the side of the track-rails and projects so far above the rail-head that the lever mechanism $a\,b$ of a locomotive passing over the same, Fig. 9, must strike against it. The said tongue $c$, Fig. 3, carries below the pivot $d$ a counter-weight $e$, which maintains the same normally in a vertical position, and it is provided with a guide-rib $m$, furnished with the shoulders $f\,f'$. In this a lever $g$, so mounted in the block A as to be enabled to turn, is guided. This lever $g$ is jointed by a rod to the elbow-lever $i$, Fig. 2. The elbow-lever $i$ in turn has its bearing at $k$ and is jointed by the connecting-rod $l$, attached to one of its legs, with the switch $C'$. Now when the switch $C'$ is set to the proper position for the train leaving the station, so that the signal of the switch indicates "line free," and consequently the train may safely travel in the direction of the arrow I, Fig. 3, then the lever $g$, Fig. 3, is, through the elbow-lever $i$ and rod $h$, so adjusted that it bears against the shoulder $f'$ of the guide-rib $m$. A train traveling in the direction of the arrow I, Fig. 3, can freely pass over the tongue $c$, as, though the lever mechanism $a\,b$, Fig. 9, of the engine strikes against the tongue $c$, it does not find any rigid resistance there, but turns the same over and is not actuated thereby. When, however, a train traveling in the direction of the arrow II passes upon the switch, the lever mechanism $a\,b$ of the engine strikes against the tongue $c$, which is fixed in that direction, because the lever $g$ bearing against the shoulder $f'$ the tongue $c$ cannot be turned or rotated in the direction of the arrow II. The striking-rod $a$ on the engine is consequently pushed upward, and thus by intervention of the rod $b$ opens the valve of the steam-whistle or of the brake, as the case may be. If a train traveling in the direction of the arrow II is to be allowed to come in, the setting of the switch must be altered. This, however, alters the position of lever $g$ also, so that it now bears against the shoulder $f$, so that the passing train can turn the tongue $c$ and pass freely. For any train passing out on the same line the point is set wrongly and the signal shows "stop." Such a train, therefore, if started will by the lever mechanism of its engine strike the fixed tongue, and thereby either the brakes are put down or the steam-whistle gives indication of the signal, even if the engine-driver should have failed to notice the signal.

If the switch is not closed entirely, so that a train coming in could force the same open, the safety device just described would offer no security for the wrongly-started train, as the lever $c$, if the point is set in this manner, finds no support either on the right hand side or on the left, and hence can be turned in either direction. The train might, therefore, pass over the safety device without warning of the danger. For switches where such inaccurate setting is possible the safety mechanism shown in Figs. 4 to 7 is employed. The tongue $c$ is here curved and directly connected with the lever $g$, so as to be free to turn.

Instead of the shoulders $f\,f'$, the bearing $n$, Figs. 6 and 7, is provided by the side of the metals.

Now when the signal and switch are set for "line free" for the train going out (direction of the arrow I, Fig. 4) the curved tongue $c$ has its aperture turned toward the direction of travel resting upon the bearing $n$. The outgoing train strikes with its lever mechanism against the raised point of the tongue $c$, and, turning the same, freely passes over the same. A train endeavoring to come in the direction of the arrow II will also strike the raised point of the tongue $c$ by its lever mechanism, but from the outside, and consequently cannot turn it, as it rests firmly upon the bearing $n$. This train thus finds a firm resistance, which actuates the alarm devices. For "line free" for incoming trains the lever $g$ has by the setting of the switch been placed in the direction opposite to that above mentioned. (See the position shown by dot-and-dash outline in Fig. 4.) An incoming train can now freely pass, turning the tongue $c$, (direction of the arrow II,) while a train that goes out wrongly meets the tongue fixed for its direction of travel, and is thus warned in time. Now if the point is not quite closed the lever $g$ does not assume one of its oblique positions, but remains, say, in its central position, and the tongue is then placed as is shown in dotted lines in Fig. 4. Whether the train now comes from the right or from the left it will always strike against the tongue $c$, so that the latter actuates the lever mechanism upon the engine. The train is, therefore, in any case warned in time. In this intermediary position of the lever $g$ the semicircular tongue $c$ must be placed horizontally, and in order to effect this with certainty a pendulum $o$ is provided on the lever $g$, one arm whereof, which is turned upward, engaging between two arms $p\,p'$ of the tongue $c$. Now when the lever $g$ assumes the dangerous central position, Fig. 5, the pendulum $o$ will hang perpendicularly, so that the tongue is set horizontally. When, however, the lever $g$ is by the setting of the switch pulled to the right, Fig. 6, the tongue $c$ will not only rotate together with the lever $g$, but it will also turn independently on its pivot $d$, as the pendulum $o$ will by the weight upon it maintain the vertical position, and consequently the arm $p$ is held back by the pendulum, and by this means the tongue $c$ is turned on the pivot $d$. The train which travels correctly—that is to say, in the direction of the arrow I—passes and turns the tongue $c$ and does not actuate the alarm devices in passing over the safety device. When the tongue $c$ is turned, the weight of the pendulum $o$ swings to the right and descends after the effect of the train upon the tongue $c$ ceases, and again puts the tongue into the proper position. (See Fig. 6.)

When the switch is set, safety apparatus above described is always placed in such a position that it will give warning of the threatening danger to the train that travels in the wrong direction. The same apparatus may, however, be connected with other signaling appliances, if desired—say the "up" and "down" signals. The rod or the wire $h$, Figs. 3 and 4, is in that case applied to the connections for such signal. If, for instance, the signal for the incoming train is set to "stop" or "danger," the safety device is also set to "danger"—that is to say, the tongue $c$ is fixed for the incoming train by one of the arrangements above referred to, so that the lever mechanism of the engine is actuated—and this is effected indifferently, whether the engine-driver does or does not see the danger-signal.

The above-described arrangment serves, also, for preventing accidents when draw-bridges are raised, as shown in the diagram Fig. 8.

At each side of the bridge and at such distance from the same that even the quickest train may yet be stopped with certainty one of the safety devices A above described is placed, and the levers $g$ of these apparatus are by the connecting-rod $h$ connected with a small lever $q$, which when the bridge is swung or raised is automatically operated in such a manner that the tongues of both safety devices are set to "danger." From whichever side, therefore, the train may come it will always be stopped in good time, and should the bridge for any reason not be quite closed, so that the track-rails of the same have not the proper relative position, the levers assume the intermediary position, Fig. 4. The tongues, therefore, are still set to "danger," and the train is stopped.

The means for insuring the safety of trains going into stations or leaving the same, as well as near bridges, &c., by the employment of the movable tongues capable of being fixed with reference to the moving train being thus described, the means for securing the vehicle or train traveling on the line against collision will next be set forth. To this end what may be termed the "station apparatus" is provided at the station by the side of the track, and by it the "line apparatus," provided at suitable distances apart upon the entire line, are so actuated that they are set to "danger" as soon as a wrong train passes the station apparatus.

The station apparatus shown in Figs. 11 to 22 again consists in the movable tongues $c$, capable of being fixed, and the devices for operating these tongues. At the side of the rails is provided a closed casing C, part of the rail-head up to the web being for this purpose removed. Through the lid of this casing rise the push-pieces $r$ $s$ in such a manner that they are depressed by the wheels rolling over the same, while the tongue $c$ projects upwardly from the box-lid and when fixed is struck by the lever mechanism $a$ $b$ of the engine. The push-piece $r$ is jointed to the lever $t$, which is acted upon by the springs $u$ $u'$ $u^2$, and at the side and at its forward position carries a pawl $v$, Fig. 16. Said pawl $v$ presses back a spring $y$, having a nose-piece $v'$, when the lever rises; but when the lever descends it does not affect this spring, as the pawl will then rise and slide past the nose-piece $v'$. The lever $t$ oscillates behind the tongue $c$ without raising the same, unless the slide D, provided at the lower end of the said tongue, is pushed back, and is thus brought within the path of the lever $t$. Now when the train runs upon the push-piece $r$ in the direction of the arrow III, Fig. 11, the lever $t$ will rise and fall, but exerts no action upon the tongue $c$, while the current that when the signal was given from the starting-station was sent into the wire 1, Fig. 11, is sent forward into the next line apparatus. This is effected as follows: When the push-piece $r$ is depressed, the lever $t$ by means of the pin 4, fixed thereon, raises the peculiarly-curved lever N, jointed to the clock-work case E, Figs. 11 and 13. Said lever N comes into contact with the tongue $o$, Fig. 12, connected by the wire 1 with the battery of the station, and as the lever N is by the wire 3 connected with the next line apparatus the current is sent to such line apparatus. After the wheel has passed the push-piece $r$ it will also pass over the push-piece $s$, depressing the same. The wedge-shaped shoulder P now pushes the lever N, jointed to box E, back by the roller H, provided in this lever, Figs. 11 and 14. (See the position shown in dotted lines in Fig. 18.) The tongue $c$, it will be seen, is not affected at all by a properly traveling train. If, however, a train moves in the direction to meet the one last referred to as moving in the proper direction—that is to say, a train moving in the direction of the arrow IV, Fig. 11—it will have sent a current through wire 3 into the clock-work E. The lever N rests upon the contact-pieces M of the clock-work, as the lever $t$ has not so far been acted upon, and as said contact-piece is by wire 2 connected with the electro-magnet F, Fig. 19, the latter attracts the armature F*, which releases the stop Q, and thus actuates the clock-work, which is of well-known construction. The eccentric K will turn and push the rod L upward, Fig. 21, the wedge-shaped head of the latter being pressed against the slide D, Fig. 15, pushing the latter so far through the tongue $c$, Fig. 15, that it will reach into the path of the lever $t$. If the train now passes over push-piece $r$, Fig. 11, the lever $t$ will raise the tongue c above the edge of the rail. The descent of the tongue c is prevented by a piece z on the spring y, which falls under a spur on the tongue, Figs. 11 and 15, and bears upon the guide-pieces 30, Fig. 13, of the tongue. The lever mechanism a b is situated between the first and second wheels of the engine, Fig. 10, so that it engages and strikes against the raised fixed tongue c before the first wheel has depressed the push-piece r. The engineer therefore receives warning of the threatening danger. When the first wheel reaches the push-piece s, depressing the same, the lever N is rotated horizontally round its fulcrum, Fig. 13, dotted position. As, however, this lever is situated between the legs of the curved spring R, Figs. 14 and 15, the latter being rigidly connected with the slide D, the slide will be withdrawn again and withdrawn from the path of the lever t. When the second wheel of the locomotive passes over the push-piece r, this will obviously be depressed again. The lever t will now, however, freely oscillate behind the tongue c, and the pawl i strikes the nose-piece v' of spring y. The latter is thereby pushed back and the piece z withdrawn from under the heel of the tongue c, Fig. 15. The raised tongue c is by this means deprived of its support and by its own weight falls back into the box C. The lever N is brought back to its original position by a spring 5, Fig. 11, and full in plan Fig. 18. As the curve of the spring R is of such width, Fig. 15, that the movement of the lever may take place without affecting the slide, all the working parts once more assume the position of rest shown in Fig. 11.

The clock-work from which the rod L derives its motion is wound up by the passing train itself, as follows: Upon the lever 6 acts (from below) the spring 7. When the lever t descends, it operates the winding-lever 6, Figs. 11, 12, and 14. The lever 6 is connected by a ratchet-and-pawl arrangement (similar to that of a ratchet-drill) connected with the arbor of the spring-barrel 8, so that when the lever t descends the pawl of the winding-lever passes without effect over the arbor of the spring-barrel, the spring 7 being at the same time put under tension by the lever 6. As the spring 7 is heavier than the springs of the clock-work within the spring-barrel 8, the said spring 7 will, when lever t rises, Fig. 12, raise the winding-lever 6, and thus wind the clock-work. Each time that a wheel passes over the push-piece r this operation is repeated until the clock-work is completely wound, and the further action of the winding-lever is prevented by the usual overwinding gear, Fig. 19. The clockwork is therefore always in readiness for effecting the movement of the slide D.

As has been stated when describing the arrangement and operation of the station mechanism, the current coming from the station-battery to the line mechanism is sent forward (when the push-piece r is depressed by the rolling wheel) by reason of the rising lever t striking, by the pin 4, against lever N and raising the same, the latter being free to move within the curve of the spring R, the lever being thus brought into contact with the tongue o, upon which a spring acts, and which is by wire 1 connected with the station-battery, so that consequently the current flows through the wire 1, tongue o, lever N, and wire 3 to the line mechanism. The latter will now be described. The said wire 3 is connected with the lever g, Fig. 23, which, under the appropriate conditions, is attracted by or released from the electro-magnet E' E$^2$. Over the lever g a conducting-frame 10 is provided, which at each side contains two contact-screws 11 12, whereof the one 11 will at the proper moment come into contact with the upper edge of the vertical arm of lever g, while the other 12 at another moment comes in contact with the lower edge of the said lever-arm, Fig. 26. In the vertical arm of lever g are provided the contact-screws 13, that form a contact with the fixed contact-piece 14, the latter being by the wire 15 connected with the electro-magnets E' and E$^2$, respectively, and from these the wires 16 pass to earth. Now when the current from the station apparatus has by reason of the train traveling over the latter been sent to the line apparatus or mechanism it will flow through wire 3 to the lever g, passing through the vertical arm of the latter and the contact-screw 13 into the contact-piece 14, arriving through wire 15 to the electro-magnet E'. Consequently the lever g is attracted (see Fig. 26) and releases a stop mechanism which fixes the tongue c immovably with reference to a wrongly-traveling train, while the tongue c remains movable with reference to the train traveling in the right direction. To this end the tongue c is mounted upon a spindle 17, Fig. 25, outside the casing, while a second tongue 18, directed downward, is fixed by a wedge in the casing C'. At both sides of this tongue 18 the levers 19 19$^\times$ are provided, and carry at their ends nearest the tongue slides 20 20$^\times$, their opposite ends being acted upon by springs 21 21$^\times$. Upon the pivots of the levers 19 19$^\times$ the levers 22 22$^\times$ are loosely mounted, and they are connected by springs 23 23$^\times$ with the rear ends of the levers 19 19$^\times$. They, moreover, have at their centers of rotation notches 24 24$^\times$, by means whereof they engage with the rear ends of the spurs of the slides 20 20$^\times$. When lever g is in a horizontal position, the levers 22 22$^\times$ bear against the said spurs, so that they are held fast and not influenced by the springs 23 23$^\times$. The levers 19 19$^\times$ are in this position of the parts just referred to horizontal, so that the tongue c (or 18) can freely swing to either side. When, however, the lever g is attracted by the electro-magnet E', Fig. 26, so that the left arm of said lever is raised, the lever 22$^\times$, Fig. 26, loses its support, and the spring 23$^\times$ draws it backward. The spring 21$^\times$ is at the same time deprived of its support and lever $19^\times$ is set obliquely. When lever $22^\times$ is tilted, the notch $24^\times$ thereof pushes the slide $20^\times$ forward. If a train now approaches in the direction of the arrow II, Fig. 26, the lever mechanism $a\,b$ on the engine strikes the tongue $c$, now fixed, and actuates the alarm device. When the tongue $c$ is thus struck, it makes a slight movement, (see dotted lines in Fig. 26,) pushes the slide $20^\times$ back as far as it will go, and thereby raises the lever $22^\times$ again, at the same time putting tension upon spring $23^\times$, and the lever $22^\times$ is again ready to engage with the spur $25^\times$. If the train moving in the direction of the arrow II is traveling rightly, then the parts on the right-hand side corresponding to those just referred to will similarly be operated, and the tongue $c$ is fixed with reference to the opposite direction of travel.

To insure that the levers 19 $19^\times$ always resume their normal position, slides 26 $26^\times$ are provided by the side of the tongue 18. They are held up by springs 27 $27^\times$ and are at the side provided with jointed pieces 28 $28^\times$. (In Figs. 24 and 27 the electro-magnets are not shown.) A train traveling in the right direction—that is to say, that of the arrow, Fig. 27—will, as stated, turn the tongue $c$. When this takes place, one of the projections 29 $29^\times$ on the center of rotation of the tongue 18 (in Fig. 27 the projection $29^\times$) bears against the jointed piece $28^\times$ and pushes the slide $26^\times$ back upon the raised arm of lever $19^\times$, so that the latter is likewise depressed, and, if the extent of motion of the slide $26^\times$ is correctly adjusted, is once more put into a horizontal position. If the tongue $c$ moves farther beyond the position in which lever $19^\times$ has been turned into a horizontal position by the slide $26^\times$, (see dotted lines showing position of tongues $c$ and 18,) the projection or spur $29^\times$ slides off the jointed piece $28^\times$. As, however, the tongue 18 also serves as a counter-weight for bringing tongue $c$ back to its upright position and is sufficiently powerful to overcome the resistance of the small spring $28^\times$, the projection $29^\times$ will again be brought over the jointed piece $28^\times$ when the tongue $c$ is raised. As the spring $27^\times$ has at the same time raised the slide $26^\times$ again, the whole mechanism will have resumed its normal position, Fig. 24. When the lever $g$ is attracted by the electro-magnet E' E', Fig. 26, the contact-screw 13 is put out of contact with the contact-piece 14, while the lower edge of the lever $g$ is brought into contact with the screw 12. At the same time, however, the upper edge of the vertical arm of this lever $g$ is brought into contact with the contact-screws $11^\times$, (left-hand side, Fig. 26,) and as this arm is by wire $3^\times$ connected with the next line mechanism the current supplied from the station or the station mechanism passes from the wire 3, right-hand side of Fig. 26, to the right-hand arm of lever $g$, through the vertical arm of the latter, through the contact-screw 12 to the conducting-frame 10, thence through contact-screw $11^\times$ to the left arm of the lever $g$, whence the current is by wire $3^\times$ carried to the next line mechanism and then farther in the manner above described through all the consecutive line mechanisms to the terminal station and to earth. The traveling train therefore by its own motion insures its safety on the entire line, so that any train traveling in the wrong direction, so as to meet it, is advised of moving in the wrong direction.

The device just described does not secure the train against another that may overtake it, and a supplemental safety device will now be described by which not only the tongue $c$ in front of the moving train, but also that behind it—that is to say, the tongue $c$ of the apparatus just passed by the train—may be so fixed that any following train that travels in the wrong direction may be stopped, and hence the train is secured at the back also.

The device or mechanism for actuating the tongue as last stated is in the present example shown as combined with a bell-signal and an automatic gate for closing level crossings.

The safety device is mounted, as in the previous examples, at the side of the track, so that the push-piece 31 projects over the railhead, Figs. 29 and 30, and is consequently depressed by the wheels of the passing train. This push-piece 31 is mounted on a spindle 32, that has suitable bearings 33, and at its end carries a cross-piece 34, Fig. 30, formed by springs. The cross-piece 34 has at either side rods 36 carrying pawls 35, engaging with ratchet-wheel $37^\times$, Figs. 28 and 30. This ratchet-wheel $37^\times$ is mounted on a spindle 37, having bearings in the casing of the mechanism, Fig. 29. On the same spindle a fly-wheel 38 is provided. The spindle 37, common to the ratchet-wheel $37^\times$ and fly-wheel 38, is hollow and receives a rod 39, one end whereof bears by a disk or stud 41 in a slot of the lever 40. The other end of said rod carries a disk 43, fitted with a tooth or pin 42. The spindle 37 also carries a loose toothed wheel 44, engaging with a rack 46, fitted with a weight 45. The wheel 44 has lateral apertures into which the tooth or pin 42 on disk 43 may take when the rod 39 is drawn back. A second toothed wheel 47 on the spindle 37 transmits rotary motion from the latter to the regulator 48, having a conical counter-weight 49, wherewith the tooth-like end of the upwardly-curved lever 40 is in contact. (See Fig. 29.) If a train passes over the push-piece 31, the latter, by reason of its segment shape, will receive an up-and-down motion each time a wheel passes over it, so that the pawls 35 cause rotation of the wheel $37^\times$, and consequently of the fly-wheel 38. It is obvious that this rotation is communicated to the spindle 37 also, Fig. 29, and is the faster the faster the train travels, and it operates the regulator 48. When the rotation of the regulator exceeds a certain speed, the counter-weight 49 rises in the well-known manner, and by reason of its conical shape the upwardly-curving arm of the lever 40 is depressed. The lower arm of this lever will therefore draw back the rod 39, mounted in the hollow spindle 37. The pin 42 of disk 43 passes into one of the recesses of the toothed wheel 44, which is thus coupled with the shaft 37, and as it gears with the rack 46 the latter, with its weight 45, is pushed upward, Figs. 29 and 31. When the weight 45 is so far raised that the teeth of the rack 46 no longer gear with the wheel 44, the said weight cannot rise farther. If the train has then passed over the push-piece 31 and the effect of the wheels upon the push-piece has ceased, the regulator will descend again. The lever 40, whose lower end is weighted, falls back and releases the coupling of the loose wheel 44 and the spindle 37, so that the weight 45 now descends automatically, unless this is prevented by the catch mechanism represented in Fig. 33.

The weight 45 serves for winding the double clock-work I II, Fig. 28, similar in construction to that shown in Figs. 19 to 22, and for automatically raising and lowering the bar at the crossing. To effect the winding of the double clock-work by the rising of weight 45, caused by the passing train, the upper part of this weight carries a roller 50, Figs. 28 and 29, and upon the spindles of the spring-barrels of the clock-work chain-wheels 51 are provided, and round these three wheels or rollers passes a chain 52, weighted with a weight 53. The chain-wheels 51 are by ratchet-teeth so connected with the wheels 54, fixed on the spring-barrels, that upon the rising of the weight 45 and the consequent descent of weight 53 the spring-barrels are moved, the springs being thus wound up, while when weight 45 descends and weight 53 consequently rises the spring-barrels do not move. By the length of the rack on rod 46 the extent to which the springs are wound is determined and overwinding of the springs prevented. Simultaneously with these operations the bar at the crossing is also raised. Besides the rod 46, the weight 45 also carries a second rack 55, Figs. 29 and 31, gearing with a loose toothed wheel 56, Fig. 32. The boss of said wheel is mounted in the casing of the mechanism so as to be free to turn. This boss is bored out and receives a rod 57, which at one end carries a disk 58, its other end engaging with the lever 59 (upon which a spring acts) similarly to rod 39. Now as the disk 58 is by a chain 60, Fig. 32, connected with the rigid arm 61 of the spindle for the bar of the crossing this bar will be lowered when the weight 45 descends if the disk is coupled with the toothed wheel. If the coupling, however, is thrown out of gear, the counter-weight of the bar will automatically lower the same. These two parts of the mechanism are coupled by a movement of the rod 57, this movement being effected by the clock-work.

The operation of the clock-work mechanism is controlled by the two angle-levers 62 $62^\times$, Fig. 28, which with their tooth-like downward-curved arms engage with the tooth-like notches on the spring-barrels 34 and whose horizontal arms are beneath the electro-magnets 63 $63^\times$. Now when a current passes through these electro-magnets the levers 62 are attracted and the clock-work released. On the spindle of each clock-work is placed an eccentric 64 $64^\times$, the two eccentrics being at an angle relatively to one another. The rods 65 $65^\times$ of these eccentrics are connected with an oscillating beam 66. The beam 66 serves for adjusting the movable tongue $c$, Figs. 29 and 30. For this purpose the tongue $c$, whose construction is analogous with or similar to that shown in Figs. 5 and 6, is attached to a disk 67, Figs. 30 and 34, so as to be enabled to rotate, and this disk is rigidly mounted on the arbor $67^\times$, having suitable bearings, the end of the arbor carrying the beam 66. When the clock-work is released, the spring-barrels turn and with them the eccentrics 64 $64^\times$ until the teeth of the levers 62 $62^\times$ engage with another notch of the spring-barrels. During this operation the eccentric 64 descends with its rod 65, and eccentric $64^\times$, with the corresponding rod $65^\times$, rises, so that the beam is in the position opposite to that it formerly occupied. This movement of the beam causes a partial rotation of the spindle $67^\times$ and of the tongue $c$, so that the latter, if previously set to "line clear" or "safety," is now set to "danger." Besides this operation the eccentrics also effect the release of the weight 45, stopped, as previously set forth, at the end of its upward stroke, and also of the clutch or connecting device of disk 58 and toothed wheel 56, so that the gate-bar at the crossing is also laid down.

In order to effect the release of the weight 45 by the eccentrics, the eccentric-rods 65 $65^\times$ are fitted with the pawls 67 $67^\times$, Fig. 33, and on the weight 45 a spring-pressed slide 68 is provided, the upper end whereof is within the path of the teeth of the pinions 69 $69^\times$, fixed on the weight, so as to be free to rotate. Before the beam 66 was set over, one of the hanging pawls (in the position represented in Fig. 33 the pawl $67^\times$) was under the teeth of the wheel 69. Now when the eccentric-rod 65 rises the pinion 69 is turned inward and the cam-tooth 70 thereon bears against the slide 68, so that the latter is pushed downward. At the same time the eccentric-rod $65^\times$ moves downward the pawl $67^\times$ bears against a projection $71^\times$ on the weight 45, Fig. 33. The latter is thus set free and may fall. The slide 68 is raised again by its spring turning pinion 69 in such manner that the foremost tooth of this wheel is brought into the path of the eccentric-rod 65. If now the latter rod descends, the pawl 67 slides over that tooth, while pawl $67^\times$, which is on the rod $65^\times$, now moving upward engages with the second tooth of pinion $69^\times$, turning said pinion, and this again depresses the slide 68, again allowing weight 45 to descend. The clock-work mechanisms are wound up again, when weight 45 is again lifted by the train passing over the push-piece 31, as hereinbefore explained.

In order to enable the gate-bar at the crossing to be closed by the descending weight 45, the toothed wheel 56 must, as already described, be coupled with the disk 58. For this object serves the lever 59, which, as likewise already set forth, is capable of shifting the spindle 57 of disk 58 in the direction of its length. Lever 59 stands at an angle and its end passes through the guide-plate 71 of the eccentric-rods 65 $65^\times$, so that it is within the path of slide 68. When slide 68 is pushed downward by one of the wheels 69 $69^\times$, it presses against the end of lever 59, passing through the plate 71, and the lever draws the disk 58 against the wheel 56, coupling the same. The descending weight therefore actuates the disk 58 also, thereby lowering the bar at the crossing. When the spring-barrels turn, the bell 72 is rung in the usual manner. The winding of the clock-work mechanism and the storing of the power for closing the gate at the crossing is thus also effected by the train passing over the push-peice 31, while the release of the clock-work at the proper time and therewith the setting of the tongue $c$, as well as the release of the weight, is effected by a current of electricity also sent by means of the passing train. The electricity is in the present example by batteries 75, connected with the apparatus, but may be furnished by induction apparatus actuated by the passing train. The wires from the batteries pass to the contact-pieces 72, which are fitted in the upper cover of a double bellows 73, fitted in the apparatus. In front of these contact-pieces are placed the fixed contact-pieces 74, carried toward one another by springs, but held apart in such manner that the line is completed only when the bellows is extended and the positive currents pass to the electro-magnets 63 $63^\times$, the negative currents passing to earth. The object of these contact arrangements is as follows: As soon as the wheels of a train pass over the push-piece 31 the spindle 32 is rotated, as hereinbefore described. Upon this spindle a lever-arm 75 is provided, Figs. 28 and 29, which by chain 76 is connected with the lever 77, Fig. 28, this latter bearing against the bottom of the bellows. The lower portion of this bellows 73, extended by an internal spring, is compressed and drives air past a back-pressure valve in the partition, Fig. 28, into the upper portion of the bellows. This upper part that previously was collapsed is now expanded. Two each of the contact-pieces 72 (one for the positive current and one for the negative current) pass between the spring-contacts 74, separating the same, so that the positive current from the battery passes to the electro-magnets 63 $63^\times$ and the line, the negative current going to earth. This contact lasts while the upper portion of the bellows remains expanded, this time being increased by providing a very small passage only from the bellows, by which the air escapes very gradually as the back-pressure valve is closed against it. The current flowing through the electro-magnets releases both (or one) of the clock-work mechanisms and the several portions of the entire arrangement work. When the train passes over the push-piece 31, both clock-work mechanisms are released and currents are sent both forward and backward along the line, so that in the mechanism in front of the train the clock-work mechanism I is released and in that at the rear the mechanism I I. This takes place by reason of the line being connected on the one hand with the electro-magnet of the clock-work I and on the other hand with the clock-work mechanism I I. Consequently the tongue $c$ of the rearward apparatus that was set to "stop" and secures the train at the rear is set to "line clear," while the tongue of the mechanism last passed by the train is set to "stop," the appliance in front affording protection to the front of the train.

It will be understood that while the safety apparatus, Figs. 2 to 9, the station apparatus, Figs. 10 to 22, and the supplemental safety device, Figs. 28 to 34, have been designed and adapted by me for co-operation, yet certain of said devices may be separately availed of—for instance, as in Fig. 8, where the safety apparatus is applied to give the alarm of an open bridge.

What I claim as my invention, and desire to secure by Letters Patent, is—

1. The combination of movable tongues $c$, means for fixing them in one position or the other, connections whereby said fixing devices may be operated to change the direction of operation of the tongues, and a signaling apparatus on the train adapted to engage the tongues, substantially as set forth.

2. The combination of movable tongues $c$, means for fixing them in position, lever $g$, connected with a movable element of the track system, connection whereby said fixing devices may be operated to change the direction of operation of the tongues, and an alarm device operated by tongues $c$ when a train passes over them, substantially as set forth.

In witness whereof I have hereunto set my hand in presence of two witnesses.

HEINRICH GEORG HELD.

Witnesses:
 A. SHEOCEN,
 G. VANDERMEULE.